United States Patent Office 3,480,534
Patented Nov. 25, 1969

3,480,534
TRANSBROMINATION PROCESS
David E. Harmer, Midland, Ramon A. Mount, East Lansing, and James J. Vanderbush, Jr., Edenville, Mich., assignors to The Dow Chemical Company, Midland, Mich., a corporation of Delaware
No Drawing. Filed May 13, 1965, Ser. No. 455,653
Int. Cl. B01j 1/10; C07b 9/00
U.S. Cl. 204—163    8 Claims

ABSTRACT OF THE DISCLOSURE

Compounds having the formula $R_1$—C≡C—$R_2$ are brominated by a process comprising contacting said compounds with a compound having the formula $$R_3-\underset{\underset{R_4}{|}}{\overset{\overset{Br}{|}}{C}}-\underset{\underset{R_5}{|}}{\overset{\overset{Br}{|}}{C}}-R_6$$

in the presence of a free radical initiator. Each R independently is selected from the group consisting of hydrogen; alkyl; aryl; alkenyl; and a chloro or bromo-substituted alkyl, aryl, or alkenyl group provided that each of $R_3$–$R_6$ independently can also be bromo or chloro.

---

This invention relates to a method of halogenating unsaturated organic compounds using a halogen-containing organic compound as a halogen donor. More particularly, the present invention relates to the bromination of an unsaturated compound with a saturated polybrominated organic compound containing at least two carbon atoms in the presence of a free radical initiator.

According to the invention, the unsaturated compound is brominated and the bromine-donating organic compound is simultaneously selectively debrominated. This process is termed "transbromination" to denote the transfer (or migration) of bromine atoms from one organic compound to another. The unsaturated hydrocarbon reactant contains at least one acetylenic bond. The transbromination reaction may be illustrated by the following equation which shows only the significant reacting moieties for clarity:

(I)    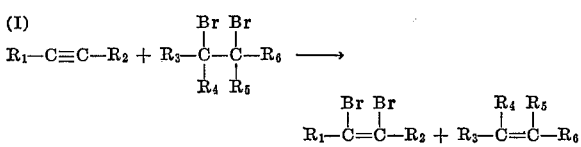

wherein each of $R_1$–$R_6$ is independently selected from the group consisting of the hydrogen atom, an alkyl group, an aryl group, an alkenyl group and a middle halo-substituted alkyl, aryl or alkenyl group provided that each of $R_3$–$R_6$ independently can also be bromo or chloro. By "middle halo" or "middle halogen" is meant a chlorine or bromine atom. In reaction I, the reactants are chosen to prepare at least one compound which is different from any of the starting materials. The unsaturated reactant is preferably a hydrocarbon containing a single acetylenic bond and no aromatic groups. The preferred bromine donor is a saturated compound containing at least four bromine atoms, with two bromine atoms on each of two adjacent carbon atoms (vicinal). A particular advantage of the process of the invention is that the bromination of the acetylene ceases after the elimination of the acetylene bond, but without the subsequent destruction of the double bond. The direct bromination of acetylene ordinarily consumes four atoms of bromine per acetylenic linkage and results in complete saturation. In (I), $R_1$ or $R_2$ may also be alkynyl, and each of $R_1$–$R_6$ may contain up to 10 C-atoms.

Typical free radical reactions which may be carried out according to the process of the invention include the following:

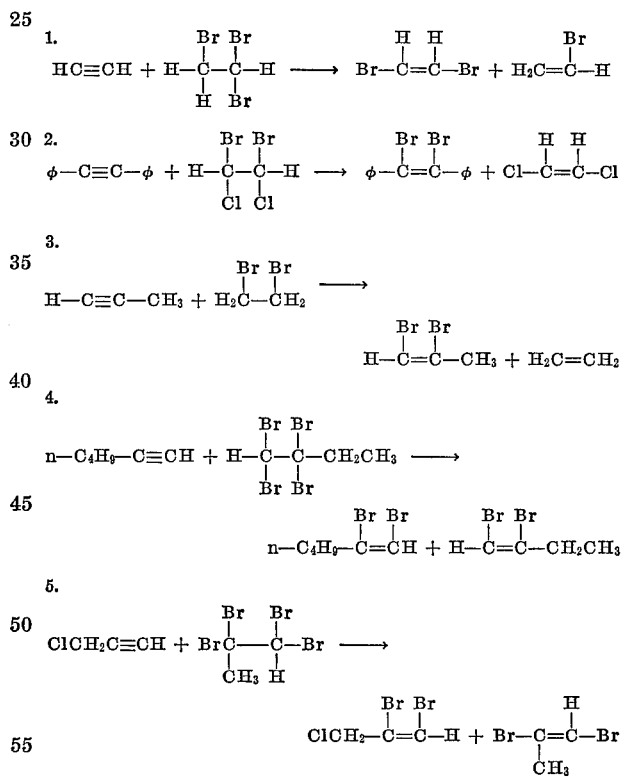

wherein φ represents the phenyl group.

Any free radical initiator may be used. Typical compounds which may be used as free radical initiators in the process of the invention include organic and inorganic peroxides [$H_2O_2$, benzoyl peroxide, di-tert.-butyl peroxide, diacetyl peroxide (acetyl peroxide), and dicumyl peroxide] as well as other conventional free radical catalysts such as azobisisobutyronitrile. In addition, it has been found that the reactions upon which the process of the invention is based may be radiation-catalyzed. The reactions may be initiated by gamma radiation, ultraviolet light or electron radiation. Electromagnetic radiation with energies in excess of 10 kiloelectron volts may be used and electromagnetic radiation with a wavelength of from $3.2 \times 10^{-5}$ cm. to $5 \times 10^{-12}$ cm. is suitable. Any conventional hard or soft radiation source may be used. Typical examples include cobalt-60 and commercial X-ray generators. Ultraviolet lamps are also commercially available for use in the ultraviolet light-catalyzed reaction. When ultraviolet light is used in the bromination process, light with a wavelength of from about 100 to 3200 Angstrom units may be used. The reactions may also be carried out with good results using a combination of radiation and an organic free radical initiator. Radiation which will generate free radicals from the saturated bromine donors is the preferred catalyst for the transbromination process. Such radiation is termed "ionizing radiation."

The term "ionizing radiation" is meant to include high energy electromagnetic radiation (wavelength below about 100 to 1000 A., energy greater than about 10 to 100 electron volts) such as X-rays (gamma rays) and corpuscular radiations such as fast neutrons, electrons, alpha-particles, beta-particles and fast fission fragments. The source of the ionizing radiation is not critical as long as the radiation employed (electromagnetic or corpuscular) induces the production of sufficient amounts of free radicals to complete the reaction. Thus, even high energy protons may be employed. Fast fission fragments as well as radiation capable of penetrating a 0.1 mm. thick piece of aluminum foil (or material of similar density) may be used in the process of the present invention. When the reaction is initiated using an electron beam, a suitable source of accelerated electrons may be obtained from a ½–10 mev. Van de Graaff generator. The source of the accelerated electrons is immaterial and other devices for producing fast electrons (up to about 20 mev. energy) such as the traveling wave linear accelerator or a resonant transformer may be employed in place of the Van de Graaff generator. Electron beams from a 0.1 mev. source may also be employed.

The electromagnetic radiation may be generated by a radioisotope source (such as cobalt-60; $\gamma$-rays) or by allowing the electrons from a fast electron generator to impinge upon a target of high atomic number (such as gold) to obtain X-rays with energies up to the energy of the accelerating potential.

Increasing the dosage of ionizing radiation increases the amount of brominated product prepared according to the process of the invention up to doses of about 50–60 megarads delivered to the unsaturated compound. Beyond this dosage the increases obtained are not economically significant.

Only an amount of catalyst (or artificially produced radiation) sufficient to produce free radicals in a quantity substantial enough to initiate and sustain the bromination reaction is required. In the case of chemical catalysts (such as peroxide compounds and other organic initiators), amounts of from about .01 to 10 percent by weight (based upon the total weight of the unsaturated compound which is to be brominated) are generally sufficient.

The bromination reaction can be carried out either with or without an inert solvent. It is generally preferably to operate without a solvent because the step of removing the products from the solvent is thereby obviated. However, in some circumstances, the use of a solvent is advantageous. For example, when the reactions are being irradiated with a source of ultraviolet light, it is convenient to use a solvent to aid in mixing the reactants during the irradiation. In the case of solid reactants, it is generally preferable to dissolve the reactants prior to irradiation rather than to irradiate the solids.

The catalytic transbromination process of the invention is generally carried out at temperatures of from room temperature (10–20° C.) to about 165° C. under atmospheric or superatmospheric pressure when using chemical catalytic agents. While the reaction may also be carried out at subatmospheric pressure, no operational advantages are obtained by this technique. When radiation is used, temperatures of from −80° C. up to the decomposition point (or production of unwanted side reactions) of the products (usually about 250° C.) may be used. The preferred reaction temperature using radiation is from about 0° C. to 140° C.

The ratio of the reactants may vary within wide limits. Good results have been obtained when at least one molecule of saturated brominated compound is present for each triple bond in each molecule of the unsaturated compound which is to be brominated. For unsaturated compounds which contain only a single acetylenic bond, at least an equimolar amount of saturated bromine-donating compound is generally sufficient.

The following examples are submitted for the purpose of illustration only, and are not to be construed as limiting the scope of the invention in any way.

EXAMPLES 1–23.—GENERAL METHODS

The saturated bromine donor reactant and the unsaturated compound to be brominated were combined by adding weighed quantities of each reactant to "Pyrex" glass ampoules, purging the mixture by several freeze-thaw cycles at 0.1–0.2 mm. of Hg to remove any dissolved gases, and sealing the ampoule with the contents at liquid nitrogen temperatures. Sample sizes of from about 5 to 10 grams (total) per "Pyrex" ampoule were used for all samples except those irradiated with ultraviolet light or an electron beam. The samples were then irradiated using the amounts of indicated in Table 1.

For the ultraviolet light-catalyzed reactions, a General Electric ultraviolet lamp No. H3FE was placed at a distance of about 4 centimeters from the sample. Energy absorbed by the reaction system was not calculated in the case of ultraviolet light-catalyzed reactions.

Gamma ray irradiation was accomplished with a cobalt-60 source. Radiation dosage was determined by ASTM Method D–1761–59 with the proper use of decay factors.

The reactions initiated by chemical free radical catalysts were run in the absence of radiation. The reactants were combined in the proportions shown in Table 1 and heated at the indicated temperatures.

A vertical Van de Graaff generator was employed to provide an electron beam suitable for irradiation. A beam current on an unscanned beam of approximately 10 microamperes at 2 mev. was used. The total sample weight (Example 21) was 29.4 grams. The beam was sent through a .002 inch thick Stainless Steel ("Type 302," stainless steel) foil window and then into the sample.

Analyses of reaction product mixtures were obtained by mass spectrometry. This technique permitted determination of the amounts of the primary products as well as side products. Solvents used are also recorded in Table 1.

Other analytical techniques employed in the experiments included gas chromatography, infrared spectroscopy and nuclear magnetic resonance spectroscopy.

The mole percent in Table 1 is based upon the total amount of the reactants plus solvent. Except where noted otherwise, all reactions were conducted at approximately 40° C.

The "rad" is the unit of absorbed dose ("absorbed dose" is the amount of energy imparted to matter by ionizing particles per unit mass of irradiated material) and amounts to 100 ergs/gram.

TABLE 1

| Example Number | Unsat. Compound | Mole Percent | Bromine Donor Compound | Mole Percent | Solvent or Catalyst | Mole Percent | Radiation Type and Intensity (Kilorads/Hour) | Total Dose (Megarads or Total Reaction Time) | Brominated Product | Mole Percent |
|---|---|---|---|---|---|---|---|---|---|---|
| 1 | Methylacetylene. | 38.1 | 1,1,2,2-tetrabromoethane. | 61.9 | | | 200 (gamma) cobalt-60 source. | 12.6 | 1,2-dibromopropene. | 16.5 |
| 2 | do | 33.5 | do | 51.8 | Cyclohexane | 14.7 | do | 12.6 | do | 17.3 |
| 3 | do | 33.4 | do | 55.2 | do | 11.4 | do | 12.6 | do | 17.2 |
| 4 | do | 36.2 | do | 56.2 | do | 7.3 | do | 12.6 | do | 17.0 |
| 5 | do | 34.6 | do | 65.4 | | | do | 4.8 | do | 11.2 |
| 6 | do | 35.5 | do | 64.5 | | | do | 9.6 | do | 14.9 |
| 7 | do | 36.3 | do | 63.7 | | | do | 14.4 | do | 16.5 |
| 8 | do | 35.5 | do | 64.5 | | | do | 20.0 | do | 19.2 |
| 9 | do | 36.0 | do | 64.0 | | | do | 28.8 | do | 21.0 |
| 10 | do | 34.7 | do | 65.3 | | | do | 37.9 | do | 22.0 |
| 11 | do | 34.9 | do | 65.1 | | | do | 51.3 | do | 21.6 |
| 12 | do | 38.0 | do | 62.0 | | | 225 (gamma) | 14.6 | do | [1]1.— |
| 13 | do | 41.0 | 1,2-dibromoethane. | 59.0 | | | do | 14.6 | do | [1]0.6 |
| 14 | do | 61.0 | 1,2-dibromo-1,1,2,2-tetrachloroethane. | 39.0 | | | do | 14.6 | do | 40.8 |
| 15 | do | 39.0 | 1,2-dibromo-1,2-dichloroethane. | 61.0 | | | do | 14.6 | do | 12.3 |
| 16 | Phenylacetylene. | 45.0 | 1,1,2,2-tetrabromoethane. | 55 | | | 220 | 37.4 | α,β-dibromostyrene. | [1]1.— |
| 17 | 1-pentyne | 50 | do | 50 | | | 220 | 8.8 | 1,2-dibromopentene. | 14.9 |
| 18[2] | Methylacetylene | 41.6 | do | 58.4 | | | Ultraviolet light. | Reaction time: 15.9 hrs. | 1,2-dibromopropene. | 14.9 |
| 19[3] | do | 25.1 | do | 27.9 | Cyclohexane | 47.0 | do | do | do | 17.9 |
| 20[4] | 1-pentyne | 50 | do | 50 | | | do | Reaction time: 3 hours. | 1,2-dibromopentene. | 6.0 |
| 21 | do | 50 | do | 50 | | | Electron | 10 | do | [1]3.0 |
| 22 | Methylacetylene. | 36.0 | do | 63.0 | Ditert.-butyl peroxide. | 0.8 | None | Reaction time: 65 hrs. Temp.: 65° C. | 1,2-dibromopropene. | 10.4 |
| 23 | do | 36.0 | do | 63.0 | Azobis-isobutyronitrile. | 0.9 | do | Reaction time: 24 hrs. Temp.: 120° C. | do | 9.5 |

[1] Low conversion of bromine donors.
[2] Sample weight: 13.23 grams total.
[3] Sample weight: 7.12 grams total.
[4] Sample weight: 10.19 grams total.

The examples summarized in Table 1 show that lower conversions of the bromine donors to compounds of less bromine content are obtained when the unsaturated compound to be brominated contains an aromatic nucleus.

In addition, bromine donors which contain more than two bromine atoms on adjacent carbon atoms are better bromine donors than saturated compounds which contain only two bromine atoms per molecule.

We claim as our invention:

1. A process for the preparation of 1,2-dibromopropene which comprises reacting methylacetylene and 1,1,2,2-tetrabromoethane in the presence of ionizing radiation with a wavelength of from $3.2 \times 10^{-5}$ cm. to $5 \times 10^{-12}$ cm.

2. A method for brominating an unsaturated compound having the formula $R_1-C \equiv C-R_2$ so as to produce a compound having the formula

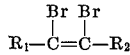

and a compound having the formula

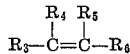

comprising contacting said unsaturated compound with a compound having the formula

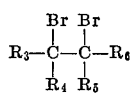

in the presence of a free radical initiator wherein each of $R_1$–$R_6$ is independently selected from the group consisting of the hydrogen atom, an aryl group, an alkyl group, an alkenyl group and a chloro or bromo substituted alkyl, aryl, or alkenyl group provided that each of $R_3$–$R_6$ independently can also be bromo or chloro.

3. The method of claim 2 wherein the free radical initiator is ultraviolet light with a wave length of from about 100 to 3200 A.

4. The method of claim 2 wherein the free radical initiator is electromagnetic radiation with energies in excess of 10 kiloelectron volts.

5. The method of claim 2 wherein the free radical initiator is an organic peroxide.

6. The method of claim 2 wherein the free radical initiator is electromagnetic radiation with a wave length of from $3.2 \times 10^{-5}$ cm. to $5 \times 10^{-12}$ cm.

7. The method of claim 2 wherein the free radical initiator is an electron beam of from 0.1 to 20 mev.

8. The method of claim 2 wherein the free radical initiator is azobisisobutyronitrile and the bromination is carried out at a temperature of from room temperature to about 165° C.

References Cited
UNITED STATES PATENTS

| | | | |
|---|---|---|---|
| 3,125,498 | 3/1964 | Bartok et al. | 204—162 |
| 3,190,825 | 6/1965 | Huyser | 204—163 |
| 3,291,710 | 12/1966 | Baniel et al. | 204—163 |

HOWARD S. WILLIAMS, Primary Examiner

U.S. Cl. X.R.

260—654, 655, 669, 677, 694